United States Patent [19]

Lee

[11] Patent Number: 5,622,482
[45] Date of Patent: Apr. 22, 1997

[54] PUMP USING SHAPE MEMORY ALLOYS

[75] Inventor: Hong-Jae Lee, Seoul, Rep. of Korea

[73] Assignee: Daewood Electronics, Co., Ltd., Seoul, Rep. of Korea

[21] Appl. No.: 550,354

[22] Filed: Oct. 30, 1995

[30] Foreign Application Priority Data

Oct. 31, 1994 [KR] Rep. of Korea ............... 94-28159

[51] Int. Cl.⁶ .................................... F04B 17/03
[52] U.S. Cl. ............... 417/321; 60/528; 417/322; 417/415
[58] Field of Search .................... 417/322, 321, 417/328, 415, 471; 60/527, 528; 92/80, 82

[56] References Cited

U.S. PATENT DOCUMENTS

| | | | |
|---|---|---|---|
| 1,216,460 | 2/1917 | Kilgore | 92/82 |
| 3,613,732 | 10/1971 | Willson | 137/625.44 |
| 4,018,547 | 4/1977 | Rogen | 417/321 |
| 4,325,217 | 4/1982 | Golesaneh | 60/527 |
| 4,434,618 | 3/1984 | Dillon | 60/527 |
| 4,472,113 | 9/1984 | Rogen | 417/60 |
| 4,811,564 | 3/1989 | Palmer | 60/527 |
| 4,955,196 | 9/1990 | Lin et al. | 60/527 |
| 5,092,901 | 3/1992 | Hunter et al. | 623/60 |
| 5,211,371 | 5/1993 | Coffee | 251/11 |

FOREIGN PATENT DOCUMENTS

| | | |
|---|---|---|
| 045250A1 | 2/1982 | European Pat. Off. . |
| 2718492 | 10/1995 | France . |
| 60-209673 | 10/1985 | Japan . |
| 4353272 | 8/1992 | Japan . |
| 6198980 | 7/1994 | Japan . |

Primary Examiner—Timothy Thorpe
Assistant Examiner—Peter G. Korytwyk
Attorney, Agent, or Firm—Fish & Richardson P.C.

[57] ABSTRACT

A pump utilizing a shape memory alloy member which is connected to electric terminals to be contracted by the supply of electric power for lowering a piston, the piston mounted to slidably move within a cylinder to thereby introduce a fluid into the cylinder is raised by a biasing force of a bias spring to externally discharge the fluid introduced in the cylinder. The pump has a simple structure which is light and easily repaired and maintained.

9 Claims, 3 Drawing Sheets

PUMP USING SHAPE MEMORY ALLOYS

BACKGROUND OF THE INVENTION

1. Field of the Invention

The present invention relates to a system for generating hydraulic pressure, and more particularly to a hydraulic pump using shape memory alloys.

2. Description of the Prior Art

FIG. 1 illustrates a conventional hydraulic generating system 10 installed in vehicles for driving an actuator of various hydraulic systems. As illustrated, the conventional hydraulic generating system includes a pump 16 for generating hydraulic pressure and a motor 12 for driving pump 16 via a coupling 14 by means of an electric power.

Motor 12 is fixed to a base plate 18 by using bolts and the like, and pump 16 is fixed to base plate 18 while being attached to a bracket 15. Motor 12 is coupled with pump 16 by means of coupling 14.

Once electric power is supplied to motor 12, motor 12 is rotated and pump 16 which is joined to coupling 14 receives the rotational force of motor 12 via coupling 14 to generate the hydraulic pressure which, in turn, is transmitted to various hydraulic systems to drive them.

In the above conventional hydraulic generating system, however, motor 12 is required as a driving power for generating the hydraulic pressure, and coupling 15 for transmitting the power of motor 12 is a requisite element.

Furthermore, bracket 15 for attaching pump 16 thereto and base plate 18 for fixing motor 12 and bracket 15 are added, which complicates the structure, makes the weight heavy, requires high cost and is difficult to repair.

On the other hand, shape memory alloys refer alloys that preserve a shape deformed by an external force below a critical temperature, whereas a shape memory effect of the alloy is activated for recovering a memorized original shape by a shape recovering force after being heated to the critical temperature. The shape memory alloys such as a titan-nickel alloy and an aluminum alloy are fabricated at a high temperature to have a predetermined shape.

There are two methods of applying heat the shape emory alloys. In the first method, fluid is forced to flow around the shape memory alloys to change the temperature of the fluid. In the second method an electric current is forced to flow along the shape memory alloys to generate heat by an electric resistance of the shape memory alloys, thereby heating the shape memory alloys.

The shape memory alloys shaped as a spring mainly respond to the temperature of the fluid flowing around the shape memory alloys or of an object contacting the alloys. In more detail, when the temperature of the fluid flowing around the spring formed of the shape memory alloy reaches the critical temperature, the shape memory alloy spring restores its original shape; otherwise, when the temperature of the fluid goes below the critical temperature, the shape thereof is deformed by the external force.

However, a structure using the above-described shape memory alloy spring has a slow response rate with respect to the temperature of the fluid, and it is difficult to accurately control the operative range of the shape memory alloy spring. Furthermore, the shape of the shape memory alloy spring is complicated, thereby making manufacturing difficult.

SUMMARY OF THE INVENTION

Accordingly, it is an object of the present invention to provide a hydraulic generating system using shape memory alloys of which the structure is simple, light and easily repaired.

To accomplish the above object of the present invention, there is provided a pump which comprises:

a body having a cylinder formed on one side thereof with an intake port for introducing a fluid, an exhaust port for externally discharging the fluid introduced into the cylinder, a drain port formed on a lower portion of the cylinder for discharging the fluid introduced to the lower portion of the cylinder, and a drain flow passage for connecting the drain port to intake port, said body having a lower portion opened;

a piston mounted to be able to slide within the cylinder, permitting the fluid to flow into the cylinder while moving from a first position to a second position, and discharging the fluid introduced in the cylinder via the exhaust port while moving from the second position to the first position;

an end cap mounted with a pair of electric terminals and coupled to the lower portion of said body to tightly close the cylinder of said body;

a biasing means installed between a lower end of said piston and an upper end of said end cap for exerting a biasing force to maintain said piston at the first position and for moving said piston from the second position to the first position; and a shape memory alloy member suspended to an outer circumference of a connecting pin penetrating through a lower portion of said piston and connected to the electric terminals of said end cap for moving said piston from the first position to the second position while overcoming the biasing force of said bias means when an electric power is supplied via the electric terminals.

Here, a unilaterally opened/closed first check valve is installed to an intake port, and a unilaterally opened/closed second check valve is installed to an exhaust port. A drain port is formed to the lower portion of a cylinder, and a unilaterally opened/closed third check valve is installed to the drain port which is connected to the intake port via a drain flow passage to drain fluid admitted in the lower portion of the cylinder.

By supplying electric power to a shape memory alloy member via a pair of electric terminals (ON), the shape memory alloy member moves a piston from a first position to a second position while overcoming the biasing force of a bias spring as the biasing means. At this time, the fluid is introduced into the cylinder via the intake port.

When the piston reaches the second position, the electric power supplied via the pair of electric terminals is cutoff to exert the biasing force of the bias spring upon the piston, so that the piston is moved to the first position while relaxing the shape memory alloy member. At this time, the fluid introduced in the cylinder is externally discharged via the exhaust port. Thus, the pump using the shape memory alloys according to the present invention is light, simple in its structure and easily repaired and maintained.

BRIEF DESCRIPTION OF THE DRAWINGS

The above objects and other advantages of the present invention will become more apparent by describing in detail the preferred embodiments thereof with reference to the attached drawings in which.

DESCRIPTION OF THE PREFERRED EMBODIMENT

A pump using shape memory alloys according to the present invention will be described in detail.

EMBODIMENT 1

Figure 1:
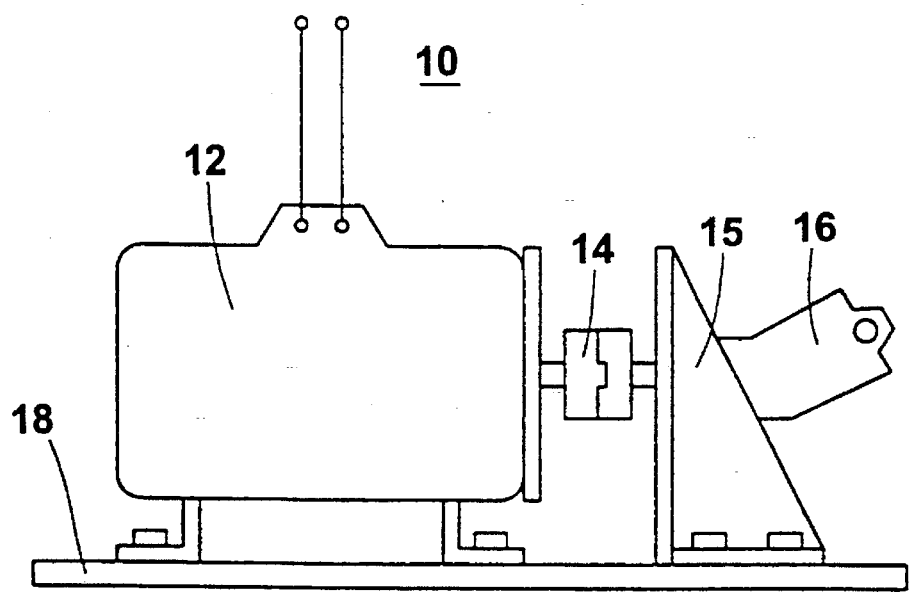
FIG. 1 is a schematic view for showing a conventional hydraulic generating system using a motor.
Figure 2:
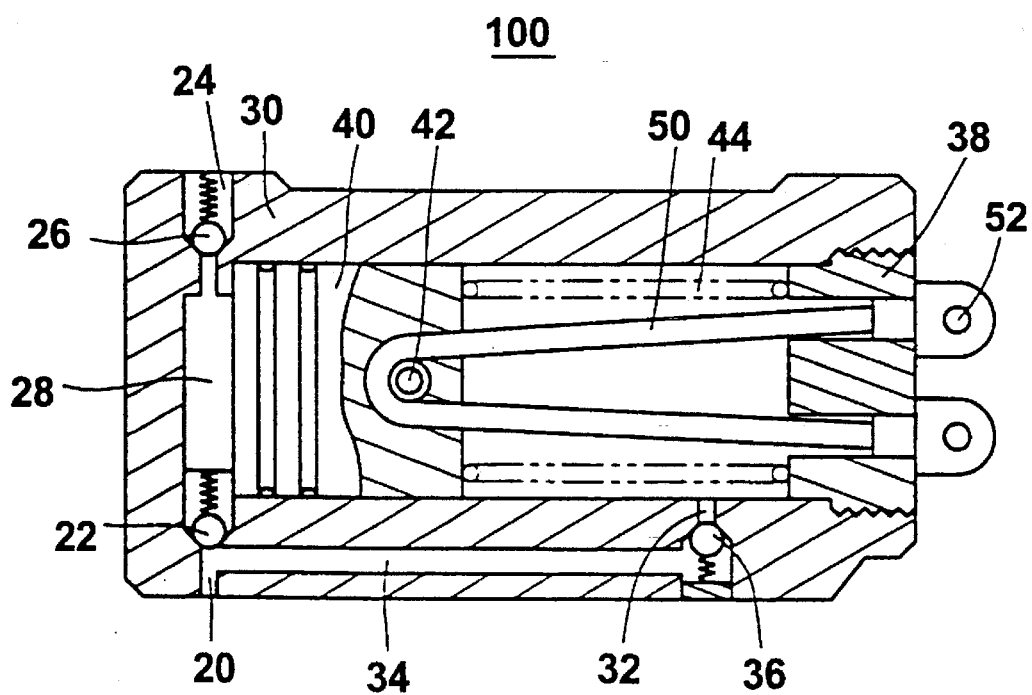
FIG. 2 is a sectional view for showing a pump using shape memory alloys according to a first embodiment of the present invention.

FIG. 2 shows a sectional view of a hydraulic pump 100 using shape memory alloys according to a first embodiment of the present invention.

Hydraulic pump 100 according to the first embodiment of the present invention includes a body 30, a piston 40 slidably mounted into body 30 for introducing and discharging fluid, and a shape memory alloy member 50 for moving piston 40 from a first position to a second position of piston 40. In addition, a bias spring 44 moves piston 40 from the second position to the first position thereof.

Body 30 is provided with an intake port 20 formed to one side thereof for introducing the fluid when piston 40 is moved from the first position to the second position, and a cylinder (or hydraulic chamber) 28 filled with fluid which is introduced via intake port 20. Also, an exhaust port 24 discharges the fluid while piston 40 is moved from the second position to the first position, and a drain flow passage 34 connects intake port 20 to the lower portion of cylinder 28 for draining resultant fluid.

Intake port 20 as above is installed with a unilaterally opened/closed first check valve 22, and exchaust port 24 is with a unilaterally opened/closed second check valve 26. A drain port 32 for draining is formed to the cylinder side of drain flow passage 34, and a unilaterally open/close third check valve 36 is installed to drain port 32. The upper portion of cylinder 28 has a jaw to block excess movement of piston 40 when moving from the second position to the first position.

At the lower portion of body 30, i.e., at the lower portion of cylinder 28, an end cap 38 mounted with electric terminals 52 is coupled to tightly close cylinder 28.

In order to maintain piston 40 at the first position, bias spring 44 for exerting a biasing force to piston 40 is mounted between piston 40 and end cap 38.

Shape memory alloy member 50 which moves piston 40 from the first position to the second position while overcoming the biasing force of bias spring 44 is suspended to the outer circumference of a connecting pin 42 penetrating piston 40 and is connected to electric terminals 52 installed to end cap 38. Shape memory alloy member 50 is contracted while overcoming the biasing force of bias spring 44 when the electric power is supplied via electric terminals 52, thereby moving piston 40 from the first position to the second position.

In order to be utilize the shape memory alloys to the pump, the total contraction and relaxation time of the shape memory alloy member should be below 100 ms, preferably ranging from 20 ms to 100 ms, and the maximum tensile force thereof should be 10 Kgf/mm$^2$. Such a shape memory alloy memory is described in a patent, e.g., U.S. Pat. No. 5,211,371 (issued to Coffee) which discloses a valve utilizing shape memory alloys. The shape memory alloys utilized in the valve of Coffee is in the shape of a wire which is electrically controlled by an electric circuit. The electric circuit is a closed circuit having a plurality of transistors and a plurality of capacitors, so that the shape memory alloys are actuated in accordance with a cycle using operations of charging/discharging the capacitors and switching of the transistors. Also, U.S. Pat. No. 5,092,901 (issued to Hunter et al.) describes shape memory alloy fibers with a very short total contraction and relaxation time suitable for being employed as an electromagnetic operator.

In the present embodiment, the shape memory alloy, e.g., disclosed in U.S. Pat. No. 5,092,901, may be utilized. In order to satisfy the conditions of the shape memory alloy member, i.e., 20 to 100 ms and 10 Kgf/mm$^2$, a single or bundle of commercially available shape memory alloy fiber may be used for forming the shape memory alloy member.

Bias spring 44 applies the biasing force upon piston 40 when the electric power supplied to shape memory alloy member 50 is turned off to move piston 40 from the second position to the first position, so that the fluid introduced into cylinder 28 is discharged via exhaust port 24 and contracted shape memory alloy member 50 is relaxed. Also, if the electric power is not applied to shape memory alloy member 50 via electric terminals 52, bias spring 44 imposes the biasing force upon piston 40 to maintain piston 40 on the first position thereof.

An operation of pump 100 having the above described structure will be described.

FIG. 2 shows an initial state of pump 100 using shape memory alloys according to the first embodiment of the present invention.

Piston 40 is placed on the upper end of cylinder 28, i.e., at the first position ,by the biasing force of bias spring 44, and bias spring 44 and shape memory alloy member 50 maintain the relaxing state. At this time, the electric power to electric terminals 52 connected with shape memory alloy member 50 is turned off, and first, second and third check valves 22, 26 and 36 maintain the closed state (initial state).

Figure 3:
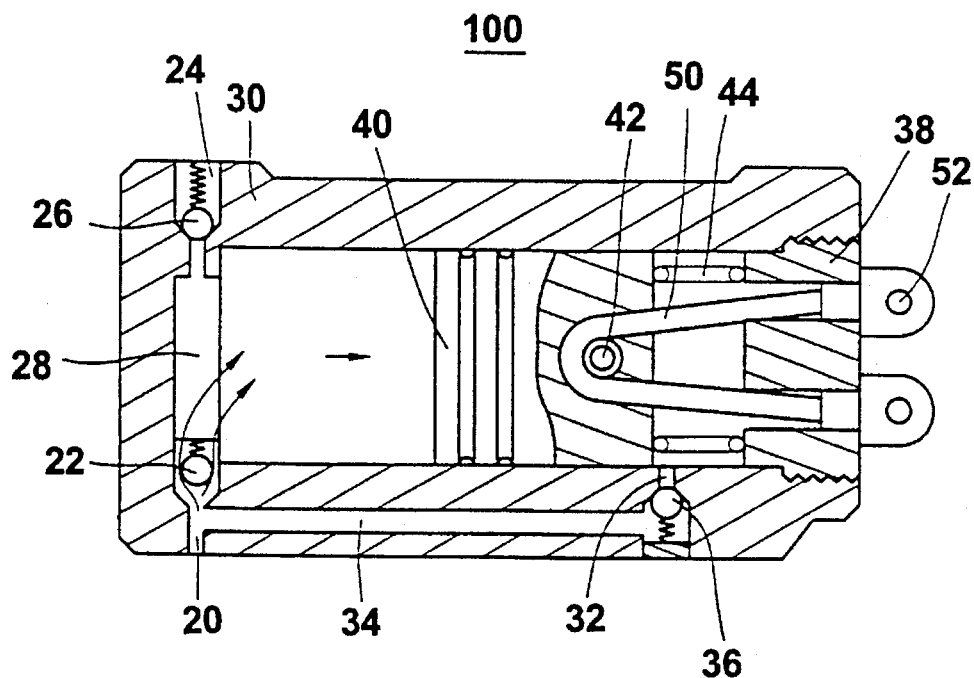
FIG. 3 is a sectional view for showing a state that an electric power is supplied to the shape memory alloys of the pump shown in FIG. 2.
Figure 4:
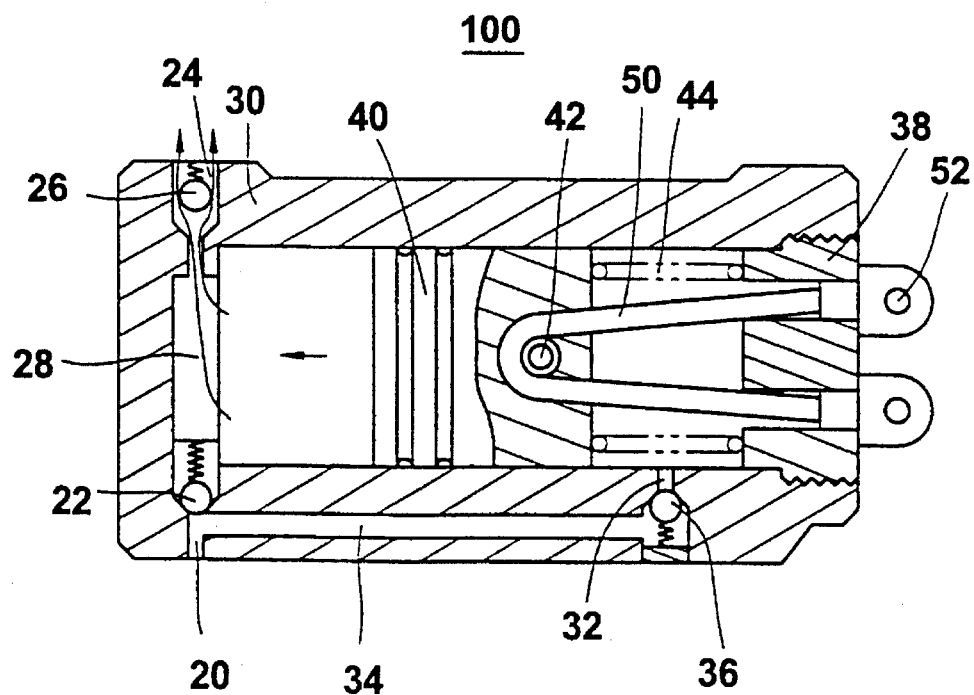
FIG. 4 is a sectional view for showing a state of generating pressure when electric power is not being supplied to the pump of FIG. 2.

Here, upon turning on the electric power to shape memory alloy member 50 via electric terminals 52, current flows through shape memory alloy member 50 heating. Then, when reaching a preset critical temperature, shape memory alloy member 50 begins to contract while overcoming the biasing force of bias spring 44. Accordingly, by the contraction of shape memory alloy member 50 suspended to connection pin 42, bias spring 44 compresses while piston 40 starts to move from the first position to the second position (refer to FIG. 3).

When piston 40 is moved from the first position to the second position by the contraction of shape memory alloy member 50, first check valve 22 is opened and the fluid is introduced into cylinder 28 via inlet port 20 (suction process).

Once piston 40 is placed at the second position, the electric power supplied via electric terminals 52 is turned off.

If the electric power to shape memory alloy member 50 is turned off, piston 40 starts to move from the second position to the first position by the biasing force of bias spring 44, and contracted shape memory alloy member 50 begins to be relaxed. At this time, first check valve 22 is closed and second check valve 26 is open to discharge the fluid from cylinder 28 via exhaust port 24 (exhausting process).

Piston 40 moving toward the first position by the biasing force of bias spring 44 is impeded by the upper portion of cylinder 28 to be placed at the first position, thereby finishing the exhaust process (initial state).

The fluid introduced into the lower portion of cylinder 28 is discharged via drain port 32 at the moment third check valve 36 is opened during the suction process, i.e., during the movement of piston 40 to the second position.

In pump 100 using shape memory alloy member 50 according to the first embodiment of the present invention as described above, the fluid (chiefly an oil) is supplied to an actuator of various oil hydraulic systems while repeating the initial state, suction process and exhausting process.

EMBODIMENT 2

Figure 5:
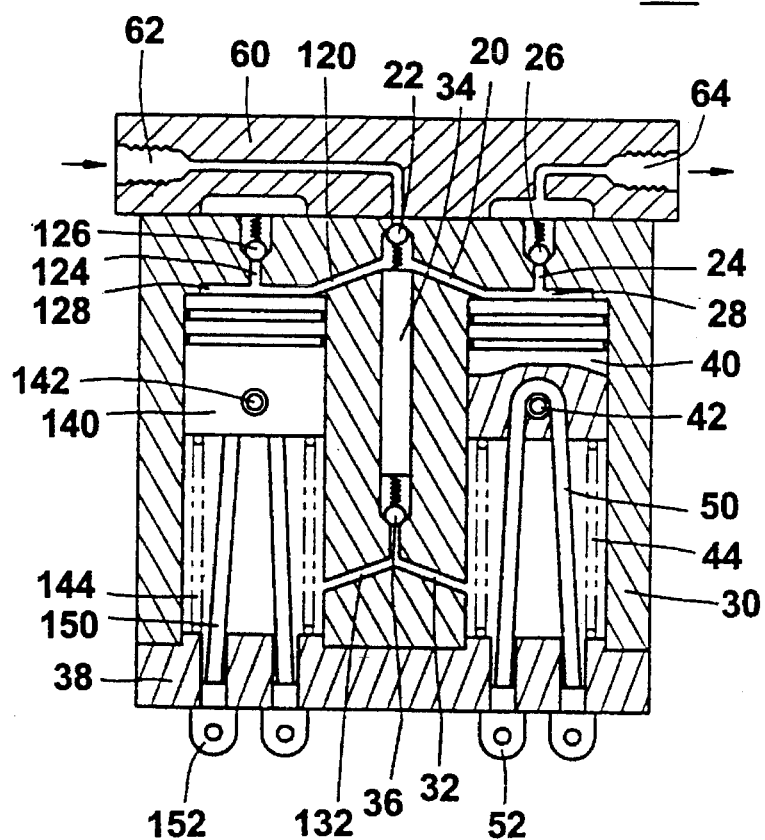
FIG. 5 is a sectional view for showing a pump of a multi-cylinder system using shape memory alloys according to a second embodiment of the present invention.
Figure 6:
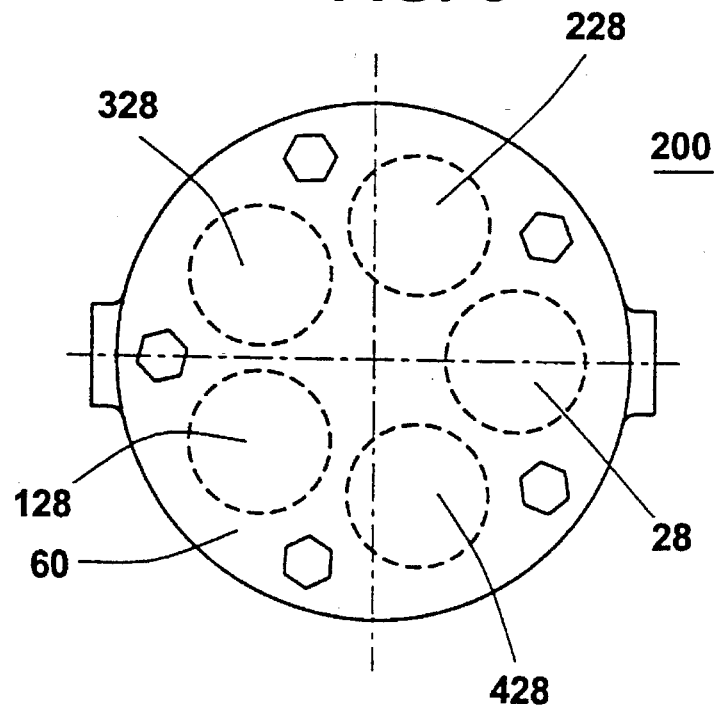
FIG. 6 is a plan view for showing the pump of FIG. 5.

FIG. 5 illustrates a pump using shape memory alloys according to a second embodiment of the present invention.

A pump 200 using shape memory alloys according to the second embodiment of the present invention includes an upper cover 60, a body 30 and an end cap 38.

Upper cover 60 has an inlet 62 for introducing fluid from a fluid source. Also, an outlet 64 which is connected to the actuator of various hydraulic systems is formed on the opposite side of inlet 62.

Body 30 includes five cylinders 28, 128, 228, 328 and 428. A first piston 40 is installed within first cylinder 28 to be able to slide between a first position and a second position of first piston 40. A second piston 140 is installed within second cylinder 128, a third piston 240 is within third cylinder 228, a fourth piston 340 is within fourth cylinder 328 and fifth piston 440 is within fifty cylinder 428, respectively slidable between their first and second positions.

On the upper portion of first cylinder 28, there are provided a first intake port 20 for introducing the fluid to first cylinder 28 and a first exhaust port 24 for discharging the fluid introduced into first cylinder 28 when first piston 40 slides from the second position to the first position of first piston 40. Similarly, a second intake port 120 and a second exhaust port 124 are provided to the upper portion of second cylinder 128; a third intake port 220 and a third exhaust port 224 are to the upper portion of third cylinder 228; a fourth intake port 320 and a fourth exhaust port 324 are to the upper portion of fourth cylinder 328; and a fifth intake port 420 and a fifth exhaust port 424 are to the upper portion of fifty cylinder 428, respectively. First, second, third, fourth and fifth intake ports 20, 120, 220, 320 and 420 are connected to one another to be further connected to inlet 62 of upper cover 60. Then, first, second, third, fourth and fifth exhaust ports 24, 124, 224, 324 and 424 are connected to outlet 64 formed in upper cover 60 via first, second, third, fourth and fifth exhaust check valves 26, 126, 226, 326 and 426.

A first drain port 32 is formed on the lower portion of first cylinder 28, a second drain port 132 is on the lower portion of second cylinder 128, a third drain port 232 is on the lower portion of third cylinder 228, a fourth drain port 332 is on the lower portion of fourth cylinder 328 and a fifth drain port 432 is on the lower portion of fifth cylinder 428, respectively. First, second, third, fourth and fifth drain ports 32, 132, 232,, 332 and 432 are connected to one another, and further connected to first, second, third, fourth and fifth intake ports 20, 120, 220, 320 and 420 via a drain flow passage 34 installed with third check valve 36.

End cap 38 is coupled to the lower portion of body 30 to tightly close cylinders 28, 128, 228, 328 and 428.

A first bias spring 44 installed between the lower end of first piston 40 within first cylinder 28 and end cap 38 exerts a biasing force to move first piston 40 from the second pg,12 position to the first position of first piston 40. A second bias spring 144 is installed between second piston 140 and end cap 38, a third bias spring 244 is between third piston 240 and end cap 38, a fourth bias spring 344 is between fourth piston 340 and end cap 38, and a fifth bias spring 444 is between fifth piston 440 and end cap 38.

A first shape memory alloy member 50 for moving first piston 40 from the first position to the second position of first piston 40 while overcoming the biasing force of first bias spring 44 is suspended to the outer circumference of a first connecting pin 42 penetrating through first piston 40. Both ends of first shape memory alloy member 50 are connected to first electric terminals 52 installed to end cap 38 to be supplied with the electric power. In the same way as first shape memory alloy member 50, a second shape memory alloy member 150 is installed between a second connecting pin 142 of second piston 140 and second electric terminals 152, a third shape memory alloy member 250 is between a third connecting pin 242 of third piston 240 and third electric terminals 252, a fourth shape memory alloy member 250 is between a fourth connecting pin 342 of fourth piston 340 and fourth electric terminals 352, and a fifth shape memory alloy member 450 is between a fifth connecting pin 442 of fifth piston 440 and fifth electric terminals 452.

Upper cover 60 and end cap 38 are respectively joined to the upper end and lower end of body 30 by means of bolts, etc.

Hereinbelow, the operation of pump 200 using the shape memory alloys according to the second embodiment of the present invention will be described.

One of first electric terminals 52 is electrically connected to ones of second, third, fourth and fifth electric terminals 152, 252, 352 and 452 to be grounded. Then, the non-grounded terminals of respective first, second, third, fourth and fifth electric terminals 52, 152, 252, 352 and 452 are electrically connected to a rotary switch or an electronic control unit (ECU; not shown) supplied with the electric power. Inlet 62 of upper cover 60 is connected with the fluid source, and outlet 64 thereof is connected with the actuator of the hydraulic system.

Upon supplying the electric power to first shape memory alloy member 50 via first electric terminals 52, first shape memory alloy member 50 moves first piston 40 from the first position to the second position of first piston 40 while overcoming the biasing force of first bias spring 44. At this time, inlet check valve 22 is open to allow the fluid to flow into first cylinder 28 from inlet 62 (suction process).

After first piston 40 finishes the movement toward the second position, the electric power supplied from first electric terminals 52 is cut off. Once the electric power is cut off, first bias spring 44 exerts the biasing force upon first piston 40 to move first piston 40 from the second position to the first position of first position 40 while relaxing the contracted first shape memory alloy member 50. At this time, first exhaust check valve 26 is opened, and inlet check valve 22 is closed, so that the fluid introduced into first cylinder 28 is discharged to outlet 64 via first exhaust port 24 (exhausting process).

Like this, the suction and exhausting processes of the fluid within second, third, fourth and fifth cylinders 128, 228, 328 and 428 are similarly executed, only that first, second, third, fourth and fifth cylinders 28, 128, 228, 328 and 428 are operated having a time difference in the sequence of a fixed order. Therefore, the fluid discharged from pump 200 using the shape memory alloy members according to the second embodiment of the present invention has a constant pressure.

As described above, the hydraulic pump using shape memory alloys according to the present invention is light and has a simple structure as compared with a conventional hydraulic generating system to facilitate its maintenance. Furthermore, the pump using shape memory alloys according to the present invention is applied to vehicles for reducing the weight of the vehicles.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A pump comprising:
    a body having a cylinder formed on one side thereof with an intake port for introducing a fluid, an exhaust port for externally discharging the fluid introduced into the cylinder, a drain port formed on a lower portion of the cylinder for discharging the fluid introduced to the lower portion of the cylinder, and a drain flow passage for connecting the drain port to intake port, said body having a lower portion opened;
    a piston mounted to be able to slide within the cylinder, permitting the fluid to flow into the cylinder while moving from a first position to a second position, and discharging the fluid introduced in the cylinder via the exhaust port while moving from the second position to the first position;
    an end cap mounted with a pair of electric terminals and coupled to the lower portion of said body to tightly close the cylinder of said body;
    a biasing means installed between a lower end of said piston and an upper end of said end cap for exerting a biasing force to maintain said piston at the first position and for moving said piston from the second position to the first position; and
    a shape memory alloy member suspended to an outer circumference of a connecting pin penetrating through a lower portion of said piston and connected to the electric terminals of said end cap for moving said piston from the first position to the second position while overcoming the biasing force of said biasing means when a electric power is supplied via the electric terminals.

2. A pump as claimed in claim 1, wherein said biasing means is a spring.

3. A pump as claimed in claim 1, wherein said shape memory alloy member has a total contraction and relaxation time of 20 ms to 100 ms, and the maximum tensile force of at least 10 Kgf/mm$^2$.

4. A pump as claimed in claim 1, wherein said shape memory alloy member is a plurality of shape memory alloy wires.

5. A pump as claimed in claim 1, wherein said pump further comprises an upper cover having an inlet connected to a fluid source and an outlet connected to an hydraulic system of a vehicle, and being fixed to an upper portion of said body,
    said body further includes a plurality of cylinders similar to said cylinder having said intake port, exhaust port and rain port, a plurality of pistons similar to said piston are respectively mounted to be able to slide between the first position and second position within said plurality of cylinders,
    said end cap further includes several pairs of electric terminals,
    a plurality of biasing means are further provided between said plurality of pistons and end cap, and
    a plurality of shape memory alloy members are further provided between said plurality of pistons and several pairs of electric terminals.

6. A pump as claimed in claim 5, wherein said biasing means is a spring.

7. a pump as claimed in claim 5, wherein said shape memory alloy member has a total contraction and relaxation time of 20 ms to 100 ms, and the maximum tensile force of at least 10 Kgf/mm$^2$.

8. A pump as claimed in claim 5, wherein said shape memory alloy member is a plurality of shape memory alloy wires.

9. A pump comprising:
    a body having a cylinder formed on one side thereof with an intake port for introducing a fluid, an exhaust port for externally discharging the fluid introduced into the cylinder, a drain port formed on a lower portion of the cylinder for discharging the fluid introduced to the lower portion of the cylinder, and a drain flow passage for connecting the drain port to intake port, said body having a lower portion opened.
    a piston mounted to be able to slide within the cylinder, permitting the fluid to flow into the cylinder while moving from a first position to a second position, and discharging the fluid introduced in the cylinder via the exhaust port while moving from the second position to the first position;
    an end cap mounted with electric terminals and coupled to the lower portion of said body to tightly close the cylinder of said body;
    a bias spring installed between a lower end of said piston and an upper end of said end cap for exerting a biasing force to maintain said piston at the first position and for moving said piston from the second position to the first position; and
    a shape memory alloy wire suspended to an outer circumference of a connecting pin penetrating through a lower portion of said piston and connected to the electric terminals of said end cap for moving said piston from the first position to the second position while overcoming the biasing force of said bias spring when an electric power is supplied (ON) via the electric terminals, wherein said shape memory alloy wire has a total contraction and relaxation time of 20 ms to 100 ms, and the maximum tensile force of at least 10 Kgf/mm$^2$.

* * * * *